United States Patent [19]

Kirkby

[11] Patent Number: 4,957,340
[45] Date of Patent: Sep. 18, 1990

[54] SYNCHRONOUS MULTIFREQUENCY OPTICAL NETWORK

[75] Inventor: Paul A. Kirkby, Old Harlow, Great Britain

[73] Assignee: STC PLC, London, England

[21] Appl. No.: 432,574

[22] Filed: Nov. 6, 1989

[30] Foreign Application Priority Data

Nov. 8, 1988 [GB] United Kingdom ............... 8826156

[51] Int. Cl.$^5$ ............................. G02B 6/28; H04J 1/00; H04J 3/00; G02F 1/00
[52] U.S. Cl. ................................. 350/96.16; 350/96.15; 370/3; 370/4; 455/606; 455/607; 455/612; 455/617
[58] Field of Search ............... 350/96.10, 96.15, 96.16, 350/96.20; 250/227.11; 455/606, 607, 612, 617; 370/1, 3, 4

[56] References Cited

U.S. PATENT DOCUMENTS

| | | | |
|---|---|---|---|
| 4,546,466 | 10/1985 | Lopiccolo | 370/3 |
| 4,628,501 | 12/1986 | Loscoe | 370/3 |
| 4,631,718 | 12/1986 | Miyao | 370/4 |
| 4,654,889 | 3/1987 | Shutterly | 370/4 X |
| 4,748,617 | 5/1988 | Drewlo | 455/612 X |
| 4,801,190 | 1/1989 | Imoto | 350/96.16 |
| 4,905,219 | 2/1990 | Barr et al. | 370/4 |

*Primary Examiner*—Brian Healy
*Attorney, Agent, or Firm*—Lee, Mann, Smith, McWilliams & Sweeney

[57] ABSTRACT

A multi wavelength optical network including a plurality of wavelength multiplexed nodes each having a single frequency optical signal transmitting means (13) and a multi wavelength optical signal receiving means (15), an optical transmission network including a passive optical coupling means (12) interconnecting said nodes whereby single frequency signals transmitted from each node are propagated via the coupling means to all the nodes, each node also including wavelength demultiplexing means (14) through which received signals are applied to the multi wavelength receiving means and timing and control means (17, 18, 19) arranged to control the timing of signals transmitted by the node over the network so that the signals from all the nodes are synchronous at the coupler.

9 Claims, 3 Drawing Sheets

SYNCHRONOUS MULTIFREQUENCY OPTICAL NETWORK

BACKGROUND TO THE INVENTION

This invention relates to a synchronous multi wavelength optical network for the transmission of data between a number of nodes of terminals.

Optical systems, utilising fibre optic transmission with various network configurations, employing either active or passive couplers and dividers, with both wavelength and time division multiplexing, are being developed at the present time. Uses include broadband overlay for subscriber access networks and ultra-high capacity packet switching for telecommunication or parallel processing computer applications. See for example A. Oliphant "Progress in the development of a digital optical routing system for television studio centres", International Broadcasting Convention IBC 88, Brighton, September 88, IEE Conference Publication No. 293 pp 90–94, D. B. Payne & J. R. Stern "Single mode optical local networks", Conf. Proc. Globecom '85, Houston, paper 39.5 and E. Authurs et al "A fast optical cross connect for parallel processing computers" Proc. 13the European Conference on Optical Communication, Helsinki, Finland, September 1987.

Such systems offer capacities which are orders of magnitude greater than electronic (time multiplexed) networks, complete flexibility of interconnect configuration, service transparency and considerable facility for future upgrades.

In order to make a particular connection between the nodes of such a network the optical receiver in the receiving node must be tuned into the same wavelength as the required transmitter. The switching and reconfiguration of connections in the network can be achieved either by switching the wavelength of transmission with fixed separate wavelength receivers at each node or by using fixed separate wavelength transmitters in each node and switched wavelength receiver.

For high speed reconfiguration of the interconnection pattern such as required by telecoms or computer packet switching applications it is necessary to devise a very rapid communication protocol between the nodes for setting up the required interconnection pattern. This is very much easier to achieve using wavelength switched transmitters and fixed wavelength receivers because in this case the network becomes "self routing" with messages automatically directed by the transmitter to the correct receiver. A good example of such a network is shortly to be published by E. Authurs et al. "HIPASS: an optoelectronic hybrid packet switching system" IEEE Jnl. on selected areas of Communications December 1988. A disadvantage with this type of network is that it requires wavelength switched transmitter components which are very difficult to fabricate with adequate performance.

SUMMARY OF THE INVENTION

According to one aspect of the invention there is provided a multi wavelength optical network comprising a plurality of nodes interconnected via a single common passive optical coupler wherein all signals transmitted over the network are synchronous at the coupler, each node receiving signals from all the nodes and each node including wavelength demultiplexing means.

According to another aspect of the invention there is provided a multi wavelength optical network including a plurality of wavelength multiplexed nodes each having a single wavelength optical signal transmitting means and a multi wavelength optical signal receiving means, an optical transmission network including a passive optical coupling means interconnecting said nodes whereby single wavelength signals transmitted from each node are propagated via the coupling means to all the nodes, each node also including wavelength demultiplexing means through which received signals are applied to the multi wavelength receiving means and timing and control means arranged to control the timing of signals transmitted by the node over the network so that the signals from all the nodes are synchronous at the coupler.

BRIEF DESCRIPTION OF THE DRAWINGS

Embodiments of the invention will now be described with reference to the accompanying drawings, in which.

DESCRIPTION OF THE PREFERRED EMBODIMENT

Figure 1:
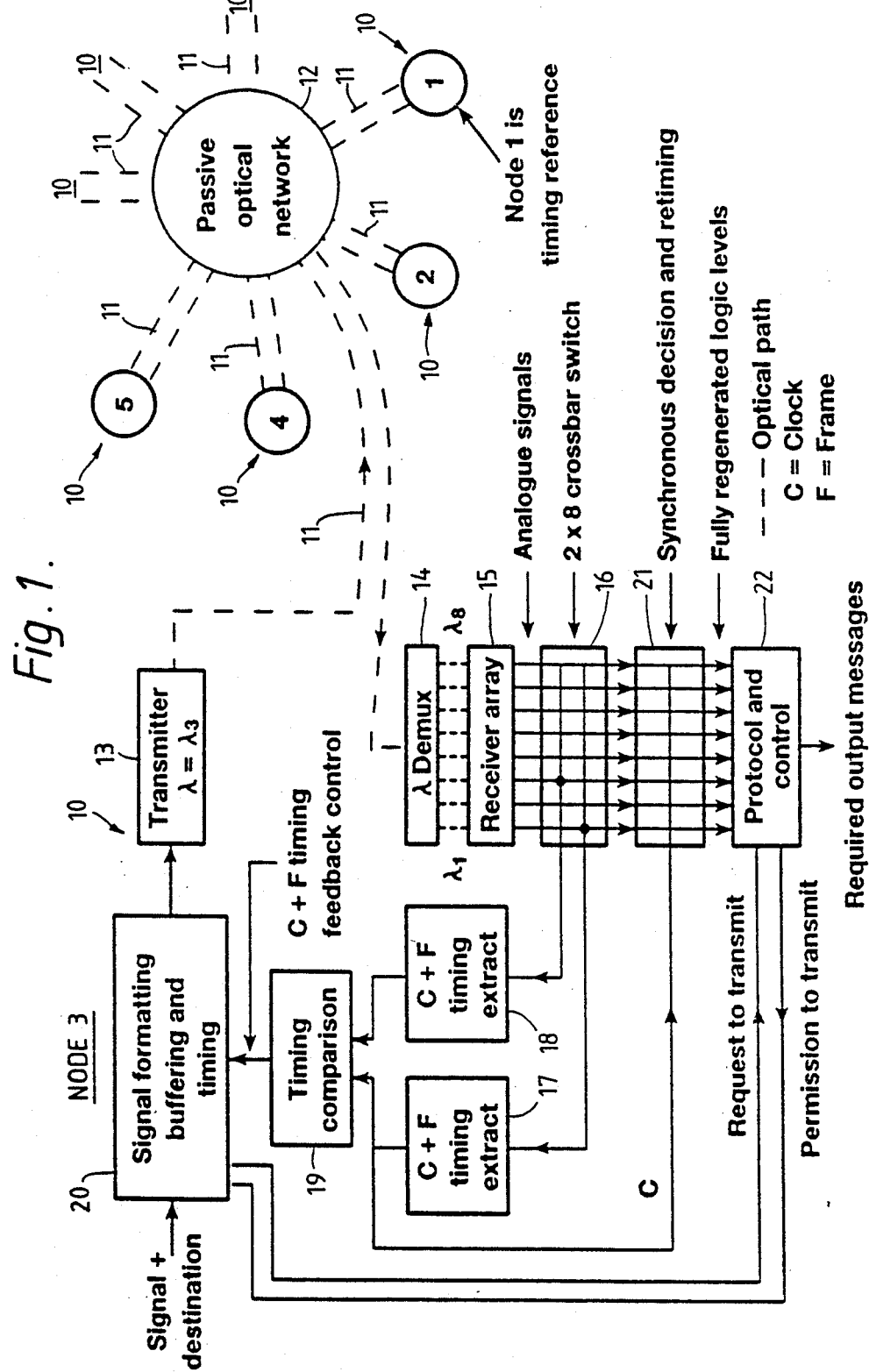
FIG. 1 illustrates schematically a synchronous multi wavelength optical network and details of one of the network nodes.

In the arrangement of FIG. 1 a number of identical node equipment 10 are interconnected by optical fibre transmission paths 11 and a passive optical star coupler 12. The design of the star coupler is such that there is only a single path from each input to every output and the difference in propagation delay for any of the $n^2$ alternative paths is a small function of one bit period (where n is the number of inputs and outputs of the coupler). In the example shown there are eight nodes altogether, the node illustrated being number 3. Each node has a single wavelength optical transmitter 13, the wavelengths for all the nodes being different. Signals from the node transmitter are propagated via the fibre and coupler network to all the nodes, including the node which originates the signals. Each node includes also a wavelength demultiplexer 14 wherein the signals from all the nodes are demultiplexed into eight channels and applied to a multichannel receiver array 15. Typically a wavelength demultiplexer uses a diffraction grating and lens to direct each separate channel wavelength signal to a separate detector. The eight analogue outputs from the receiver array are fed to a 2×8 crossbar switch 16 which can select two out of all the channels, one of which corresponds to the node's own transmission, i.e. channel number 3. The other channel selected is common to all the nodes, e.g. channel number 1, and is used as a reference channel. The signals in the two selected channels are fed to respective clock and framing timing extraction circuits 17, 18. The clock extracted in circuit 17 is used as a reference clock derived from the transmissions from node 1. The clock extracted in circuit 18 is the node 3 clock as received back from the star coupler 12. Assuming wavelength dispersion of transmission velocity from the star coupler to the node is negligible (or small enough to be compensated for) then synchronisation at the coupler gives synchronisation at all the nodes. (It will be appreciated that all signals are, of course, delayed by the same propagation delay.) Therefore to ensure that the signals are synchronous at the coupler each node has a timing comparison circuit 19 at which a comparison is made between the clock received from the reference node 1 and the node 3 clock received back from the coupler. If the two clock signals are not synchronous as received at node 3 a feedback control signal is applied to the signal formatting, buffering and timing circuit 20 which creates the framing format to be sent by the transmitter.

Figure 2:
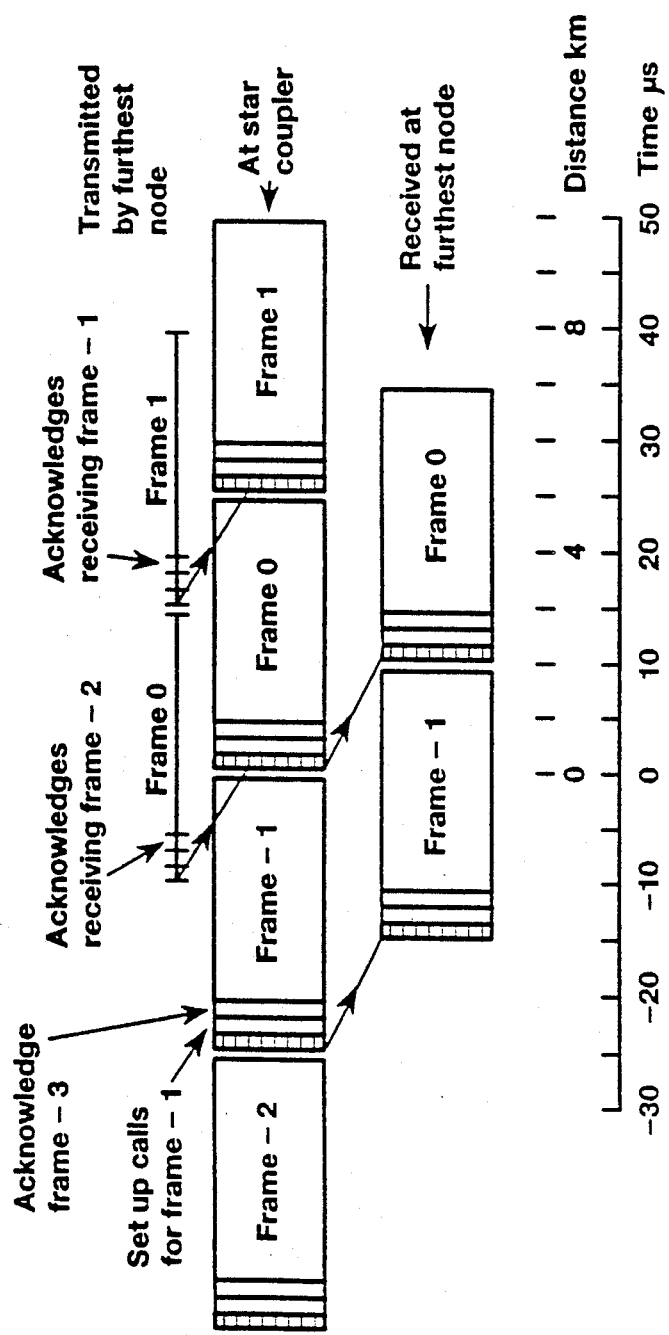
FIG. 2 illustrates the timing frame signals in the network.

The messages and data transmitted over the network will typically be in some type of repetitive frame structure which also includes the network control information. The network is synchronised at both the bit clock and frame level. Typical clock rates are of the order of tens of thousands of megahertz and typical frame times are greater than the longest time it takes a signal to cross the network. FIG. 2 shows the timing of frame signals transmitted from a distant node arriving synchronously with frames from all the other nodes (each node transmitting on a different wavelength) at the coupler 12. All the frames are then broadcast synchronously to all the nodes.

Returning to FIG. 1, once the clock and frame transmission times of each node are precisely adjusted so that its returning signal is exactly synchronised with that arriving from node 1 then the signals from all the nodes will be synchronous at the star coupler and at demultiplexer 14 and receiver 15. A common clock C, e.g. from circuit 17, can then be used to regenerate fully the signals arriving from all the nodes in the synchronous decision and retiming circuit 21. This greatly simplifies receiver design at the e node and enables instantaneous switching from one wavelength to another without any delay caused by re-synchronising the clock in the receiver circuit.

Figure 3:
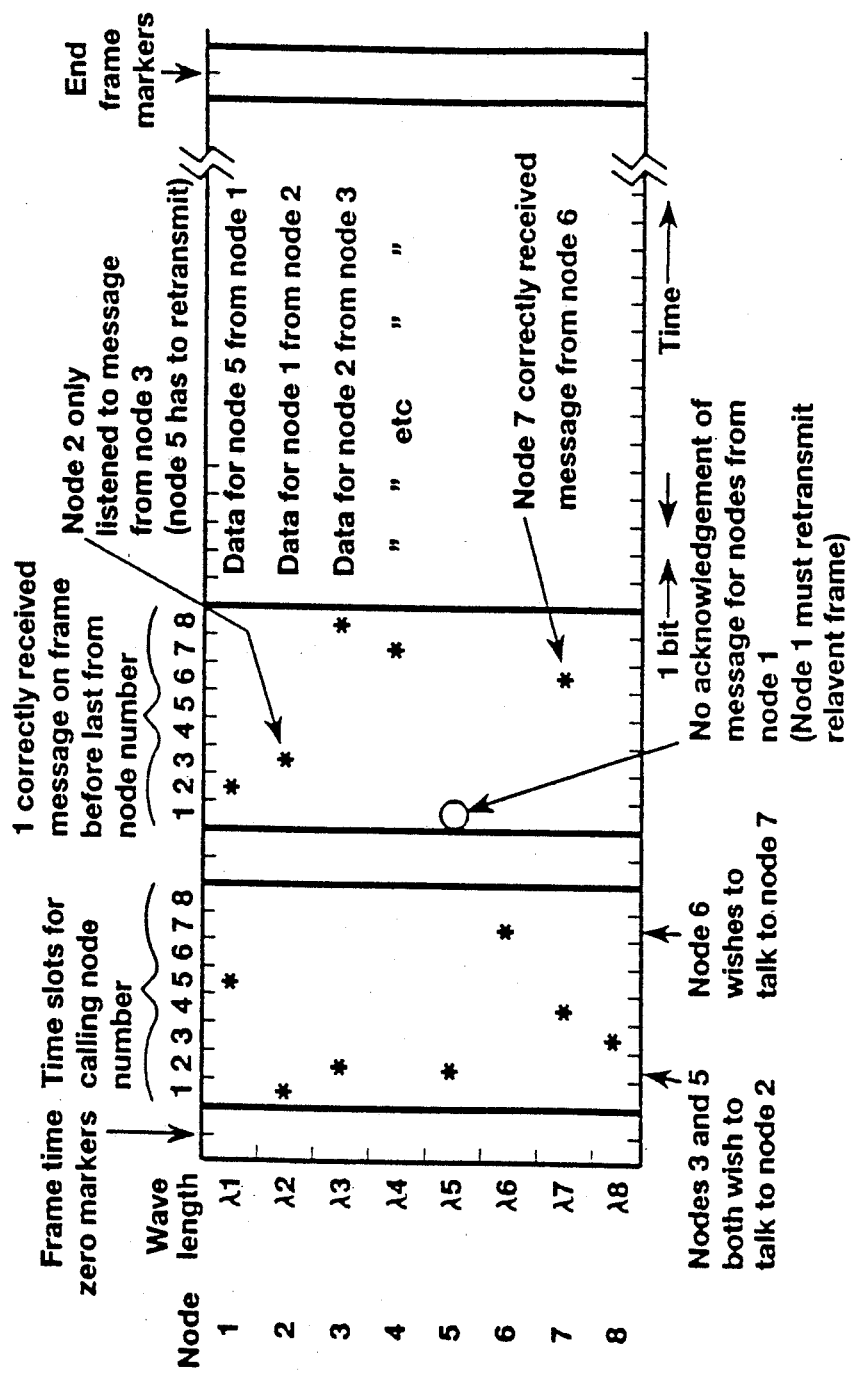
FIG. 3 illustrates a protocol for controlling message or data transfers across the network.

Once the nodes are all operating synchronously it is also a simple matter to device a protocol for setting the desired message or data transfers across the network. FIG. 3 shows a simple example. At the beginning of each frame comes the frame "time zero" marker. Then 8 time slots are allocated solely for setting up transfer destinations. i.e. the calling node number. Thus, if node 1 wishes to transmit to node 5 it sends a marker in time slot 5 as shown in FIG. 3. Likewise both nodes 3 and 5 wish to transmit to node 2 so they each insert a marker in time slot 2. All the eight nodes use the eight time slots to indicate to which nodes they wish to transmit.

The next few time slots may be left blank to provide a separation between the calling time slots and the next eight acknowledgement time slots. In these acknowledgement time slots each node inserts a marker to acknowledge receipt of a message received two frames previously. The two frame delay is due to the propagation delay across the network. The rest of the frame structure is then used for transmitting the message or data, except for the last few time slots which are used for the end-of-frame markers.

There are many potential variations on this protocol which will be dependent on application. Telecoms applications may be use long frames (125 us each) with relatively slow circuit switching protocols. Multiprocessor computer and advanced telecom packet switching applications may require the transmission of packets much shorted than the frame time. Transmission links can be set up on short sub-frames with many sub-frames in the full frame. However it is fundamental that acknowledgement cannot be achieved in less than twice the transit time between the nodes.

In all multinode networks solving the problem of resolving contention between two nodes both transmitting to the same node or one node transmitting to an already busy node is a key requirement. This is easily done with great rapidity because all nodes see all contention problems with a delay determined only by their distance from the central passive star coupler. If common rules are used for resolving contention then each interested nodes can work out for itself how the contention is resolved. For example in FIG. 3 contention is shown between nodes 3 and 5 both wishing to transmit to node 2. The rule for resolving contention might be that the lowest node number always win. In this case node 5 would know it had failed to send a message to node 2 as soon as its transmitted frame returned from the star coupler because it will at that time see that it's calling marker in time slot 2 coincides with a calling marker in time slot 2 of the frame transmitted by node 3. It does not have to wait two frames more for a failure to acknowledge from node 2. It is also easy for a node to transmit regular information showing whether it is available to accept an incoming message (to prevent overload if it is busy with some other task). Referring to FIG. 3 it can be seen that time slot n on wavelength n is vacant in all cases as it represents a node calling or acknowledging itself. These redundant wavelength time slots can be used for sending messages representing "I am busy" or any other pre-agreed meaning.

The invention described herein shows how by appropriate synchronisation of transmission from the separate nodes a multi wavelength network can be made which is capable of very high speed reconfiguration and uses fixed wavelength receivers. Important subsidiary advantages confused by the synchronisation are the great simplification of the receiver circuitry at each node and the ability to precisely synchronise distributed processors with respect to one another.

I claim:

1. A multi wavelength optical network comprising a plurality of nodes interconnected via a single common passive optical coupler wherein all signals transmitted over the network are synchronous at the coupler, each node receiving signals from all the nodes and each node including wavelength demultiplexing means.

2. A multi wavelength optical network including a plurality of wavelength multiplexed nodes each having a single wavelength optical signal transmitting means and a multi wavelength optical signal receiving means, an optical transmission network including a passive optical coupling means interconnecting said nodes whereby single wavelength signals transmitted from each node are propagated via the coupling means to all the nodes, each node also including wavelength demultiplexing means through which received signals are applied to the multi wavelength receiving means and timing and control means arranged to control the timing of signals transmitted by the node over the network so that the signals from all the nodes are synchronous at the coupler.

3. A network according to claim 2 wherein each node includes means for selecting received signals being the node's own transmitted signals received back from the coupling means, means for selecting received signals from another node, means for extracting clock and timing signals from both selected signals and means for comparing the two extracted clock and timing signals to derive control signals for the control means to control the timing of the signals transmitted from the node.

4. A network according to claim 2 wherein each node includes means for synchronously retiming and regenerating the demultiplexed received signals from all the nodes.

5. A network according to claim 3 wherein each node includes means for synchronously retiming and regenerating the demultiplexed received signals from all the nodes.

6. A network according to claim 1 wherein message or data transfers across the network are effected in frames which are timed to be synchronous at the coupler, the frames having a common format comprising a number of time slots wherein each frame includes frame timing signals, message or data destination signals, acknowledgement signals and message or data signals, wherein the destination and acknowledgement signals are time distributed within the frame to provide node identity.

7. A network according to claim 2 wherein message or data transfers across the network are effected in frames which are timed to be synchronous at the coupler, the frames having a common format comprising a number of time slots wherein each frame includes frame timing signals, message or data destination signals, acknowledgement signals and message or data signals, wherein the destination and acknowledgement signals are time distributed within the frame to provide node identity.

8. A network according to claim 7 wherein the destination and acknowledgement signals are time multiplexed with the message or data signals within each frame.

9. A node for a synchronous multifrequency optical network including a single wavelength optical signal transmitting means and a multi wavelength optical signal receiving means, said receiving means including optical wavelength demultiplexing means, means for extracting clock and timing control signals from demultiplexed received signals to derive control signals to control transmission of signals from the node and means for synchronously regenerating received demultiplexed signals.

* * * * *